L. S. CHICHESTER.
Improvement in Scouring and Hulling Machines.

No. 125,172. Patented April 2, 1872.

UNITED STATES PATENT OFFICE.

LEWIS S. CHICHESTER, OF BROOKLYN, NEW YORK, ASSIGNOR TO CHARLES F. CHICHESTER, OF SAME PLACE.

IMPROVEMENT IN SCOURING AND HULLING MACHINES.

Specification forming part of Letters Patent No. 125,172, dated April 2, 1872.

*To all whom it may concern:*

Be it known that I, LEWIS S. CHICHESTER, of Brooklyn, in the county of Kings and State of New York, have invented an Improvement in Scouring and Hulling Grain, Rice, &c., and the following is declared to be a correct description thereof:

The object of this invention is to remove, by a rubbing action, a portion or the whole of the hull or skin of grain, rice, corn, or other seeds, so that the grain or kernel shall be free, or nearly so, of those portions of the hull that interfere with the subsequent operations of preparing the article for market or use by cracking, grinding, bruising, or otherwise.

Figure 2:
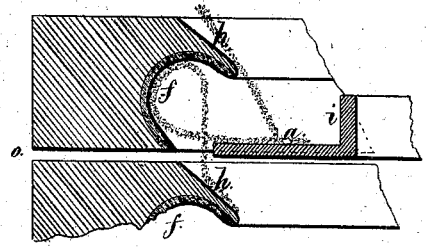
Figure 1:
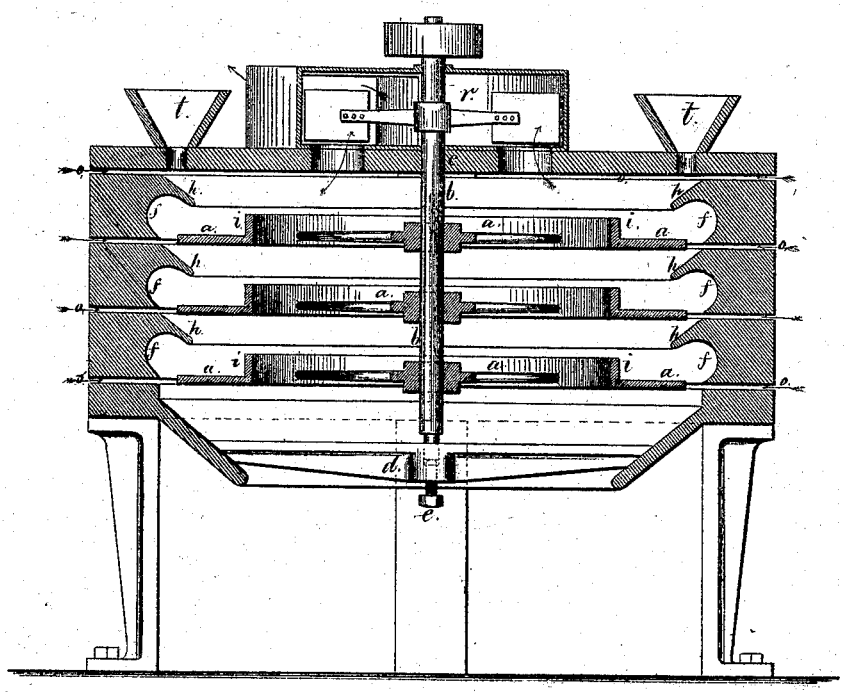

In the drawing, Figure 1 represents a vertical section of the said machine, and Fig. 2 is a section, in larger size, of one of the centrifugal hurlers and concave abraders.

The centrifugal hurlers, *a*, are mounted upon a vertical shaft, *b*, that is sustained in bearings *c d*, and the shaft *b* may be moved by a screw, *e*, endwise so as to adjust the position of such hurlers relatively to the concave abraders. Each hurler, *a*, is made as a disk and preferably with an open center to admit a circulation of air freely, and with a cylindrical flange, *i*, to prevent the grain passing off the disk through the central opening. Around these disks forming the hurlers *a*, are the concave abraders *f*. Each of these is made as a ring, or segment of a ring, so that the interior surface will be a cove, and said surface is made by artificial or natural stone, or emery, or roughened metal, so as to scrape, scour, polish, grind, or crack the hulls or skins of the grain or similar material that is thrown with considerable force by the centrifugal action of the revolving hurlers *a*, against the said surface of the abraders. The grains as they are thrown off are arrested by the concaves or coves of the abraders and travel diagonally along such surface and upward until the shape of the cove throws them down between the edge of the hurler *a*, and the abrader *f*, where they fall upon the incline *h*, and slide off upon the next hurler *a*, below, and the operation is repeated. The number of hurlers and abraders is to be sufficient to operate to the desired extent, either in rubbing of the ends of the hulls, the polishing of the surface of the grains, or the entire removal of the hulls by the violent concussion. The abraders are supported in a suitable frame or upon segmental supports, and between the respective rings or sections there are openings, *o o*, to admit air. The blower *r* causes a current of air and conveys away from the apparatus the dusty and fine particles that are removed by the abraders. By raising up the shaft *b*, and hurlers *a*, by the set screw *e*, there will be more space left between the edges of the hurlers and the abraders; hence the grain will deliver more rapidly. The grain is admitted by one or more spouts, *t*, and received into a hopper with a delivery opening at the bottom.

I claim as my invention—

The revolving centrifugal hurlers, *a*, in combination with the concave ring-shaped abraders *f*, the parts being constructed and operating substantially as set forth.

Signed by me this 16th day of September, A. D. 1871.

LEWIS S. CHICHESTER.

Witnesses:
GEO. T. PINCKNEY,
CHAS. H. SMITH.